Patented Dec. 10, 1940

2,224,352

UNITED STATES PATENT OFFICE 2,224,352

METHOD OF PROCESSING WOOD FOR THE RAPID MATURATION OF WHISKY AND OTHER ALCOHOLIC LIQUORS AND WINES

Ernst T. Krebs and Ernst T. Krebs, Jr., San Francisco, Calif.

No Drawing. Application January 21, 1938, Serial No. 186,186

20 Claims. (Cl. 99—48)

This invention relates to a method of processing wood for the rapid maturation of whisky and other alcoholic liquors and wines.

It has been discovered that oak wood contains cryptogamic spores which, when activated into profuse growth, have beneficial action on liquors and wines; that is, the products of the growth resulting from the activation of the cryptogamic spores bring about rapid maturation or ageing of the liquors or wines. The phenomenon is as follows:

The spores when properly activated bring about a profuse cryptogamic growth. The cryptogamic growth in turn secretes an enzyme complex which is rich in tannase and it is rich in aminosuccinamides. The tannase hydrolizes the tannins in the oak wood, thereby forming principally gallic acid, and this is finally oxidized into ellagic and other acids, which form their corresponding esters with the alcohols in the liquor or wines. Upon the addition of liquor or wine, the aminosuccinamide is dissolved and finally dissociated into succinic and succinamic acids and amino groups, and at the same time causes oxidation. The succinic and succinamic acids, as well as the amino groups, form their corresponding esters.

While the cryptogamic growth takes place in the regular barrel-ageing process, it does so slowly, taking a period of years to mature the liquor or wine properly. By comminuting the wood to provide a large exposed surface area, and by activating the spores to rapid and abundant growth, a large amount of tannase and amino-succinamide is produced in a short period of time, and it is the abundant supply of these two constituents, and the ready access of the liquor to dissolve them, that brings about rapid maturation of the liquor or wine.

In our Patent No. 2,070,794, we depended upon the action of an emulsin complex to bring about rapid growth of the cryptogamic spores. We have now found that many vegetable hormones, or chemicals having chemical properties similar to these hormones, may be used in great dilution with or without the use of an emulsin complex, to activate the cryptogamic spores into profuse and rapid growth. We have also discovered that if an emulsin complex and a hormone are used in conjunction, a very much greater dilution is possible to bring about this profuse growth, and that if either the emulsin complex or a hormone is used alone, a stronger solution is required. The combination of the emulsin complex and the hormone is preferable as it is more economical and more efficacious. Briefly stated, the method is as follows:

An oak wood container, charred or uncharred, or oak wood in a comminuted state, raw or toasted, is treated with solutions containing a hormone or hormones obtained from different kinds of vegetation, particularly those which are extracted by water from legumes, more particularly when germinated; also the aqueous extracts of other seeds such as alfalfa, different grains, clover, and also from de-fatted kernels of the prunus family; diastase, extracts of molds and fungi, as well as certain chemicals such as acetic, valeric, butyric, and propionic acids and particularly indole compounds of these and other acids and activated by dilute solutions of magnesium chloride, calcium chloride and/or alkaline iodides, and to a lesser extent by other halides; all for the one purpose of stimulating a cryptogamic growth from their spores in the oak wood to furnish the two constituents which are essential in bringing about the so-called ageing changes in wines and liquors. These two constituents are the enzyme tannase secreted by the cryptogamic growth which hydrolyzes the tannins, and the aminosuccinamide constituent of the cryptogamic growth, which causes oxidation of the alcohols and furnishes the important amino, succinic and succinamic esters when it becomes dissociated in the alcoholic liquid.

The hormones or chemicals are used in very dilute solutions, with very dilute solutions of an emulsin complex, or either can be used alone. For example, if the hormone used is an auxin or heteroauxin, one part will be dissolved in approximately 100,000 parts of magnesium chloride solution of the approximate strength of 1 part in 500 parts of water. The toasted comminuted wood is processed by adding a sufficient amount of this solution to make the wood quite moist, placing the same in a closed oak wood, glass, or other suitable container, in a moderately warm place, to remain from 2 to 4 weeks. The contents should fill only half or two-thirds of the container, so that the comminuted wood can be stirred every day or two by revolving the container, thereby mixing the upper and less moistened wood with the more moist lower strata in the container. Every other day, beginning about the tenth day, a small sample of the processed wood is macerated for 12 hours with about four or five times its bulk volume of 100 proof new whisky, and tested for complete tannin conversion and for acids. When three drops of a 1% aqueous solution of ferric chloride is added to 2 cc. of this extract, no blue color or precipitate should be produced, but a clear olive-green color should result, showing the extract is free of gallic acid. The extract should not contain less than 25 grams of acid to 100,000 cc. of the alcoholic extract, which acid is principally acetic acid. If the test proves the tannic and gallic acids of the wood have been fully converted, and the acid content of the new whisky macerated with the processed wood for 12 hours is up to at least the minimum standard, then it is ready for treatment of the new whisky. The processed comminuted wood is now placed in a closed vessel provided with a drain spout at the bottom, and about three to six times (depending upon the wood) the bulk volume of new whisky is poured in and allowed to macerate for from 2 to 4 hours. It is then drained out, and immediately returned and allowed to macerate for from 10 to 20 hours. These two macerations are done for the purpose of better extraction and mixing. The whisky is now drained and placed in an oak wood, glass or other suitable container and left to stand in a moderately warm place for 30 to 90 days, when it will be ready to be bottled and sold as aged whisky.

In case the liquor is "aged" by this process in an oak container, the container itself should be processed by spraying the solution of hormone or chemical into the container under pressure, and maintaining the pressure for several days, to insure penetration of the solution into the wood. After the tightly closed oak wood container has set in a warm place for 30 to 90 days, the cryptogamic growth will be relatively profuse through a fair depth of the wood, and then the new whisky is to be placed in the processed oak wood container and allowed to remain in a warm place for 3 to 6 months. Containers of 10 to 20 gallon capacity have proven to be the best size, due to the relatively greater surface area exposed to the liquor than with large containers.

In case of new wine to be treated, this should have gone through the stages of alcoholic fermentation and have slightly entered the stage of acetic fermentation, to the point where it has a distinctly tart taste. For the treatment of wine, the processing of the oak wood container, or the comminuted oak wood, is just the same as for treating whisky, and the macerating process is just the same, but where the comminuted oak wood process is used, the proportion of new wine to the processed oak wood is much greater than in the case of whisky, and the wine should be filtered and bottled as soon as it is drained from the processed comminuted wood.

While in the example given a vegetable hormone has been described, it should be understood that an emulsin complex and a hormone may be used in conjunction, and that a much greater dilution is then possible to bring about the same activation and profuse growth of the cryptogamic spores. On the other hand, a hormone alone or an emulsin complex alone may be used, but a stronger solution will be required. The combination of an emulsin complex and a hormone is preferable, as it is more economical and more efficacious.

When an emulsin complex derived from the kernel of the fruit of *Prunus armeniaca* is used in combination with a hormone or with a chemical of the same or similar chemical groups as the hormone, the emulsin complex can be used in a solution of one part to 50,000 to 100,000 parts of magnesium chloride solution of a dilution of one part to 500 parts of water; and the hormone, for instance heteroauxin, can be used in a solution of one part to 1,000,000 parts or more of a solution of magnesium chloride of a solution of one part to 500 parts of water.

Magnesium chloride may be employed, and so may calcium chloride, and/or sodium iodide. Activation to a lesser degree is produced by other halides, as they function as activators or catalyzers for the emulsin complex and the hormones.

The purpose of charring or toasting the oak, whether in comminuted form or not, is to dehydrate the tannins contained in the wood. When the wood is moistened with water during the first step of processing the wood, the tannins again become hydrated, which tannoid is apparently an intermediate tannoid body between gallic and ellagic acids, giving a blue reaction with ferric salts. When these are later acted upon by the enzyme complex rich in tannase, which is secreted by the cryptogamic growth, they are apparently oxidized to ellagic acid, which again gives a green coloration with ferric salts.

When the new whisky or wine, containing ethyl and other alcohols, is added to the processed comminuted wood and allowed to macerate for several hours, all the changed products of the wood which are soluble in hydro-alcoholic liquid, readily dissolve, leaving practically nothing behind but the cellulose of the wood. It is for this reason that only a few hours are required for the maceration of the hydro-alcoholic liquid in the processed comminuted wood. The whisky or wine may therefore be placed in any suitable container, such as charred oak barrels or containers made of glassware or the like, as it needs no further treatment with the oak wood.

The method produces the same biological (cryptogamic growth) and chemical phenomena which occur in the staves of the oak barrel containing whisky, wine or other alcoholic liquors, in the regular barrel ageing process, with the advantages that this process gives a much more profuse cryptogamic growth, which is easily accessible to the hydroalcoholic solvent and which results in a greater production of aminosuccinamides, which in turn produces greater oxidation, aldehydation and esterification.

We have determined that many chemicals are able to produce a profuse cryptogamic growth, but the chemicals which particularly stimulate a profuse growth are many acids (particularly acetic, butyric and propionic acids) combined with indole or other similar groups. We have also found that certain coal tar acids such as naphthalene acids, and even furfural itself, will stimulate the cryptogamic growth.

The term "hormones" as used in the claims is intended to cover any non-animal hormones, including those derived from roots, barks, woods, herbs, leaves, seeds and plant products, or a synthetic hormone or compound having spore activating characteristics similar to the vegetable hormone.

Having thus described our invention, what we claim and desire to secure by Letters Patent is:

1. In a method of processing oak wood to produce a prolific growth from its cryptogamic spores, the products of which growth promote oxidation, aldehydation and esterification during the ageing of spirituous liquors, those steps which consist in reducing the oak wood to a comminuted form and moistening the comminuted wood with a solution containing a growth-activating vegetable hormone.

2. In a method of processing oak wood to produce a prolific growth from its cryptogamic spores, the products of which growth promote oxidation, aldehydation and esterification during the ageing of spirituous liquors, those steps which consist in reducing the oak wood to a comminuted form and moistening the comminuted wood with a solution containing a growth-activating vegetable hormone and an emulsin complex.

3. In a method of processing oak wood to produce a prolific growth from its cryptogamic spores, the products of which growth promote oxidation, aldehydation and esterification during the ageing of spirituous liquors, those steps which consist in reducing the oak wood to a comminuted form and moistening the comminuted wood with a solution containing a solution of a growth-activating vegetable hormone and magnesium chloride.

4. In a method of processing oak wood to produce a prolific growth from its cryptogamic spores, the products of which growth promote oxidation, aldehydation and esterification during the ageing of spirituous liquors, those steps which consist in reducing the oak wood to a comminuted form and moistening the comminuted wood with a solution containing a solution of a growth-activating vegetable hormone, an emulsin complex and magnesium chloride.

5. In a method of processing oak wood to produce a prolific growth from its cryptogamic spores, the products of which growth promote oxidation, aldehydation and esterification during the ageing of spirituous liquors, the step comprising treating oak wood with a growth-activating vegetable hormone.

6. In a method of processing oak wood to produce a prolific growth from its cryptogamic spores, the products of which growth promote oxidation, aldehydation and esterification during the ageing of spirituous liquors, the step comprising treating oak wood with a growth-activating vegetable hormone and an emulsin complex.

7. In a method of processing oak wood to produce a prolific growth from its cryptogamic spores, the products of which growth promote oxidation, aldehydation and esterification during the ageing of spirituous liquors, the step which consists of impregnating the staves of an oak wood container with a solution containing a solution of a growth-activating vegetable hormone and magnesium chloride.

8. In a method of processing oak wood to produce a prolific growth from its cryptogamic spores, the products of which growth promote oxidation, aldehydation and esterification during the ageing of spirituous liquors, the step which consists of impregnating the staves of an oak wood container with a solution containing a solution of a growth-activating vegetable hormone, an emulsin complex and magnesium chloride.

9. In a method of processing oak wood to produce a prolific growth from its cryptogamic spores, the products of which growth promote oxidation, aldehydation and esterification during the ageing of spirituous liquors and wines, the steps which consist in reducing the oak wood to a comminuted form, toasting the comminuted wood to dehydrate the tannins contained therein, and activating to prolific growth cryptogamic spores contained in the comminuted wood by moistening the wood with a solution containing a growth-activating vegetable hormone.

10. In a method of processing oak wood to produce a prolific growth from its cryptogamic spores, the products of which growth promote oxidation, aldehydation and esterification during the ageing of spirituous liquors and wines, the steps which consist in reducing the oak wood to a comminuted form, toasting the comminuted wood to dehydrate the tannins contained therein, and activating to prolific growth cryptogamic spores contained in the comminuted wood by moistening the wood with a solution containing a growth-activating vegetable hormone and an emulsin complex.

11. In a method of processing oak wood to produce a prolific growth from its cryptogamic spores, the products of which growth promote oxidation, aldehydation and esterification during the ageing of spirituous liquors and wines, the steps which consist in reducing the oak wood to a comminuted form, toasting the comminuted wood to dehydrate the tannins contained therein, and activating to prolific growth cryptogamic spores contained in the comminuted wood by moistening the wood with a solution containing a solution of a growth-activating vegetable hormone and magnesium chloride.

12. In a method of processing oak wood to produce a prolific growth from its cryptogamic spores, the products of which growth promote oxidation, aldehydation, and esterification during the ageing of spirituous liquors and wines, the steps which consist in reducing the oak wood to a comminuted form, toasting the comminuted wood to dehydrate the tannins contained therein, and activating to prolific growth cryptogamic spores contained in the comminuted wood by moistening the wood with a solution containing a solution of a growth-activating vegetable hormone, an emulsin complex and magnesium chloride.

13. The method of treating oak wood to produce a prolific growth of its cryptogamic spores comprising treating the wood with a spore-activating material selected from the group consisting of an indole compound of a lower fatty acid and derivatives thereof.

14. The method of ageing spirituous liquors comprising treating the same with oak wood containing vegetable hormone activated spores.

15. The method of treating oak wood to produce a prolific growth of its cryptogamic spores comprising treating the wood with a spore-activating hormone selected from the group consisting of a vegetable hormone and a synthetic hormone having spore activating characteristics similar to the vegetable hormone.

16. Oak wood containing cryptogamic spores activated into prolific growth, said growth being rich in aminosuccinamides, said oak wood having its tannin compounds dissociated and being adapted to produce in spirituous liquors, in a relatively short time, the same physical, chemical, and biological phenomena as occur over a period of years when spirituous liquor is treated with normal unactivated oak wood.

17. Oak wood containing cryptogamic spores activated into prolific growth, said growth being rich in the enzyme tannase and in aminosuccinamides, said oak wood being adapted to produce in spirituous liquors, in a relatively short time, the same physical, chemical, and biological phenomena as occur over a period of years when spirituous liquor is treated with normal unactivated oak wood.

18. Toasted oak wood containing cryptogamic spores activated into prolific growth, said growth being rich in aminosuccinamides, said oak wood having its tannin compounds dissociated and being adapted to produce in spirituous liquors, in a relatively short time, the same physical, chemical, and biological phenomena as occur over a period of years when spirituous liquor is treated with normal unactivated oak wood.

19. Comminuted oak wood containing cryptogamic spores activated into prolific growth, said growth being rich in aminosuccinamides, said oak wood having its tannin compounds dissociated and being adapted to produce in spirituous liquors, in a relatively short time, the same physical, chemical, and biological phenomena as occur over a period of years when spirituous liquor is treated with normal unactivated oak wood.

20. Comminuted oak wood containing cryptogamic spores activated into prolific growth, said growth being rich in the enzyme tannase and in aminosuccinamides, said oak wood being adapted to produce in spirituous liquors, in a relatively short time, the same physical, chemical, and biological phenomena as occur over a period of years when spirituous liquor is treated with normal unactivated oak wood.

ERNST T. KREBS.
ERNST T. KREBS, Jr.